United States Patent

[11] 3,588,516

| [72] | Inventor | Joel S. Friedman |
| | | Manchester, N.H. |
| [21] | Appl. No. | 746,790 |
| [22] | Filed | July 23, 1968 |
| [45] | Patented | June 28, 1971 |
| [73] | Assignee | Beede Electrical Instrument Co., Inc. |
| | | Penacook, N.H. |

[54] METER RELAY HAVING CONCENTRIC CONTROLS AND METER-READING SENSORS
4 Claims, 7 Drawing Figs.

| [52] | U.S. Cl. | 250/231, 324/157, 324/96 |
| [51] | Int. Cl. | G01d 5/32, G01r 5/00 |
| [50] | Field of Search | 250/231; 324/157 |

[56] References Cited
UNITED STATES PATENTS

| 597,470 | 1/1898 | Norden | 338/134 |
| 3,249,759 | 5/1966 | Sendro | 250/231 |
| 3,307,414 | 3/1967 | Naber et al. | 74/10.54 |
| 3,337,739 | 8/1967 | Sendro | 250/231 |
| 3,349,245 | 10/1967 | Hosker | 250/231 |

FOREIGN PATENTS

| 1,194,164 | 6/1965 | Germany | |

*Primary Examiner*—Robert Segal
*Attorney*—Joseph Weingarten

ABSTRACT: A control meter relay having one or more set points, the set point controls extending concentrically from the front of the meter coaxial with the axis of rotation of the meter movement, allowing control of the set points from one location on the front of the instrument. Another feature is that the zero adjustment means of the meter movement may also be concentric with the set point controls.

INVENTOR
JOEL S. FRIEDMAN
BY Joseph Weingarten
Lawrence A. Mayham
ATTORNEYS

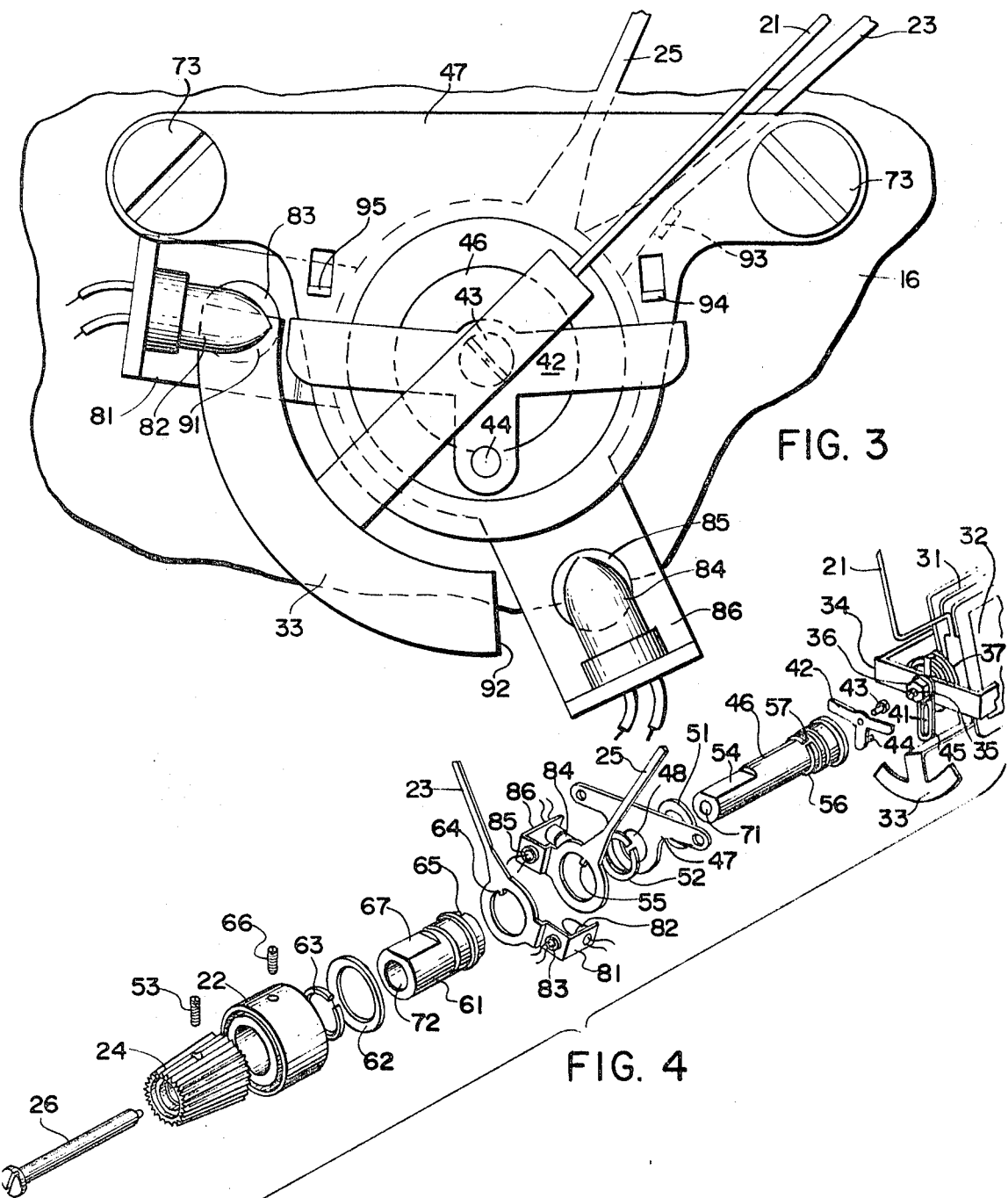

METER RELAY HAVING CONCENTRIC CONTROLS AND METER-READING SENSORS

FIELD OF THE INVENTION

This invention relates in general to electrical measurement and control apparatus and is more particularly concerned with novel control and adjustment means for a noncontacting control meter relay.

DISCUSSION OF THE PRIOR ART

In general terms, a meter is an instrument whose purpose is to measure the value of some variable. Electric meters measure an electrical analog of the variable and are normally of the indicating type. An indicating meter generally includes an indicating pointer connected to the meter movement and provides visual indication of the value of the variable being measured in conjunction with a scale. For special purposes, a nonindicating meter may be used. It has the same internal construction but has no scale or indicating pointer. To facilitate further discussion and description, the meters considered below are of the indicating type unless specific reference is made to nonindicating meters.

It is often desired to actuate some external system as, for example, an alarm, or to automatically control some system function whenever the variable being measured by the meter either rises or falls to some predetermined value. The device known as the control meter relay is currently in widespread use for this purpose. A control meter relay is, broadly, a modified meter of either the indicating or nonindicating type which is adapted to detect the angular position of the meter movement when it reaches some predetermined, and usually readily selectable, location, normally termed a set point. Associated electrical circuitry then uses the signal generated by the detector to perform some desired external function. The general method of operation of a meter relay is that the set point is chosen on the instrument scale and a set pointer within the instrument is manually positioned at the scale location.

The techniques by which passage of the indicating pointer through the set point is sensed are generally well known in the art. It is frequently a requirement that the meter provide uninterrupted visible indication of the magnitude of the variable being measured even after the reference point has been reached and passed. In such cases, the means for sensing the position of the indicating pointer should normally operate without making contact with the pointer or impeding its movement. Several types of noncontacting sensors are in widespread use in meter relays including photoelectric, inductive, capacitive and thermal radiant.

Many noncontacting meter relays employ various combinations of elaborate gear trains, prisms, lever, lenses and other related complex an bulky equipment to achieve the desired sensitivity with useful reliability for detecting indicating pointer position. Many of the present meter relays have placed the detectors behind the meter face well within the meter itself. This configuration has necessitated relatively complex equipment to provide access to the set point controls on the front of the instrument. Furthermore, the offset location of set pointer controls on the front of the meter tends to disfigure the meter face and complicate the design of the meter by their presence. The remote location of the detector with respect to the manually operated set pointer control often requires gearing, linkages or other indirect control connections between the control and its associated detector apparatus. Such indirect connections often result in a certain amount of backlash which, due to the fact that the detector apparatus is hidden form view, may provide some degree of error between the location of the visible set point and the angular location of the detector apparatus.

Meter relays may be made with a single set point, or with two or more set points to indicate high, low or intermediate conditions. When the set point control is located at the front of the meter, the single eccentric of nonsymmetrical set point frequently provides an unbalanced appearance which, in some installations, is aesthetically undesirable. Furthermore, set point controls occupy a certain amount of space on the front of the meter. Where other elements such as pilot lights and switches necessarily are located on the meter face, a cluttered appearance could result with the addition of one or more separate set point controls. Another drawback of the eccentric set point control configuration is that when a meter is to be mounted behind its mounting panel, separate holes in the panel are normally required for each such control.

SUMMARY OF THE INVENTION

Broadly speaking, the invention herein described comprises a photoelectric meter relay having one or more set points wherein the external set point controls are concentric and are coaxial with the axis of rotation of the indicating pointer. An additional feature is that the zero adjustment control may also be concentric with the set point controls, with the result that only a single hole is required in the meter face or in the mounting panel (for behind panel mounting) for both the zero adjustment control and the set point controls irrespective of whether there are one or more set pointers. Furthermore, each set pointer has its set point control and sensor directly attached to it so that backlash is eliminated and there can be no ambiguity between the location of the set pointer and the angular position of its respective detector apparatus. This meter relay employs a vane attached to the indicating pointer which interrupts a light beam directed onto a photocell on each set pointer. The angular width of the vane is slightly longer than the angular path of travel of each set pointer so that each set pointer detector is capable of being operated upon by only one edge of the vane thereby preventing ambiguities as to the direction of travel of the indicating pointer. By having all of the meter controls concentric, most of the front of the meter is free for the location of other indicators or switches as desired.

BRIEF DESCRIPTION OF THE DRAWINGS

The features and advantages of this invention will become apparent from the following detailed description when read in conjunction with the accompanying drawing in which:

FIG. 3 is an assembly view looking outward toward the front of the meter form the inside thereof;

FIG. 4 is an exploded view of the control elements of the meter relay of FIG. 1; and FIGS. 5A, 5B and 5C are diagrammatic views of the pointers and sensing apparatus at different operational locations.

DESCRIPTION OF THE PREFERRED EMBODIMENT

Figure 1:
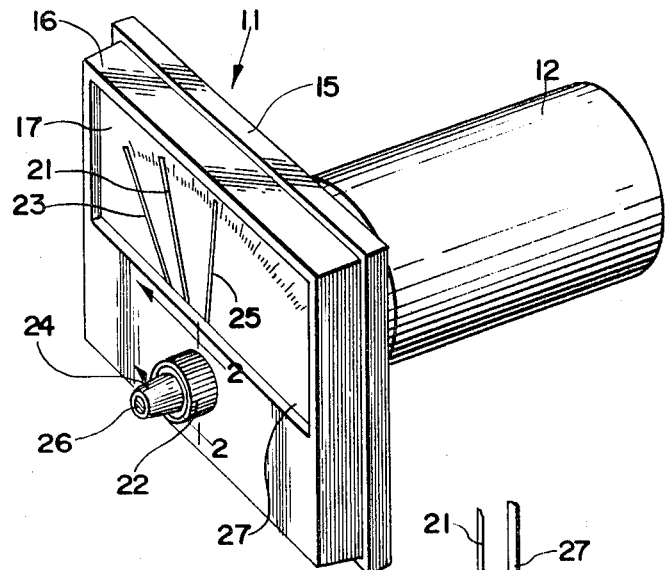
FIG. 1 is a perspective view of a meter relay constructed in accordance with the principles of this invention.

With reference now to the drawing and more particularly to FIG. 1 thereof, there is shown a complete meter relay package comprising meter 11 and control package 12 which contains suitable electrical relay circuitry and has external electrical connections (not shown). Meter 11 has a case generally comprised of base 15, cover 16 and glass face 17. Within the case is indicating face or dial 27 with which indicating pointer 21 cooperates to provide visual indications. Protruding from the front of cover 16 is low set pointer knob 22 which is directly connected to low set pointer 23, and high set pointer knob 24 which is directly connected to high set pointer 25. Adjustment shaft 26 also extends from the meter case through the cover and is connected to the meter movement through appropriate conventional linkages for angular adjustment of the meter movement. This adjustment shaft is normally termed the meter "zero adjustment."

Figure 2:
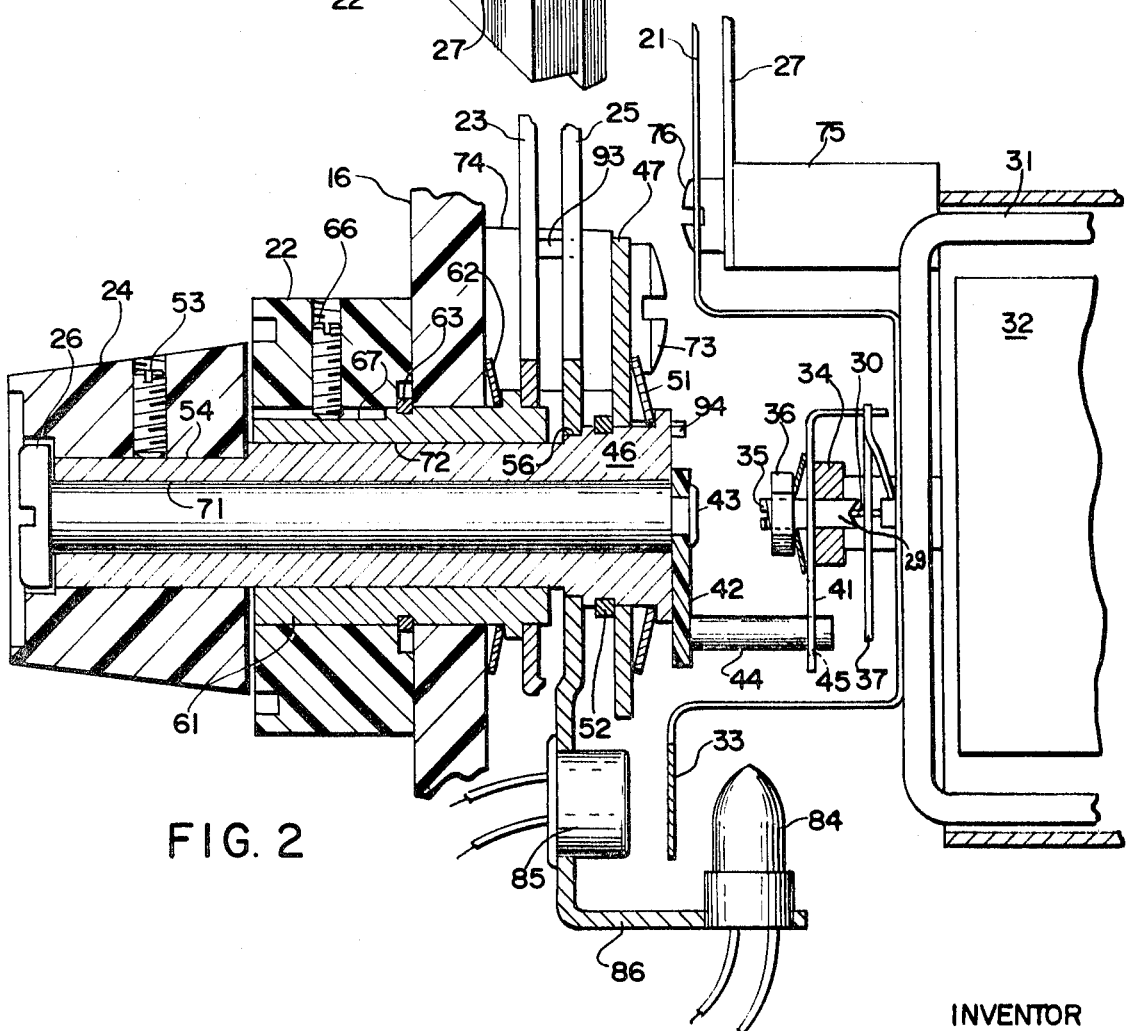
FIG. 2 is a partial cross-sectional view taken through cutting plane 2-2 of FIG. 1.

The details of the control portion of this novel meter relay are shown clearly in the sectional assembly view of FIG. 2 together with the exploded view of FIG. 4. The meter movement is the standard D'Arsonval type having a magnetic member 32 in cooperation with which indicating pointer 21 and moving coil 31 are pivoted as a unit on jeweled bearings, or suspended by taut bands. The former type of pivot is shown in the drawing, wherein one bearing 29 is mounted on bracket 34. Pivot point 30 attached to indicating pointer 21 and coil 31 is pivoted in the bearing. The jewel clearance is adjustable by means of jewel screw 35 and conventional lock nut 36. Hair spring 37, through which the zero setting of indicating pointer 21 is controlled an maintained, has its fixed end attached to spring holder 41. The spring holder is rotatably mounted on bracket 34 to provide for zero adjustment of the pointer. Zero adjustment crank 42 is secured to the inner end of zero adjustment shaft 26 by means of screw or rivet 23. Pin 44 of zero adjustment crank 42 engages slot 45 of spring holder 41. The minute adjustments needed for the zero setting of indicating pointer 21 are then easily conducted by inserting a screwdriver into the slot in the outer end of zero adjustment shaft 26 and turning in either direction to make the necessary adjustments. An opaque vane 33 is also secured to moving coil 31 diametrically opposed to indicating pointer 21. Its purpose will be discussed later. Of course, the vane may be secured at any angle with respect to the indicating pointer and it need not be diametrically opposed.

High set point shaft 46 passes through hole 48 in high set pointer bracket 47 and is rotatably secured therein by means of circular leaf spring 51 and retaining ring 52. High set pointer knob 24 is secured to high set pointer shaft 46 by means of setscrew 53 which engages flat surface 54 on the shaft. High set pointer 25 is formed with key 55 and is force fitted on shoulder 56 of shaft 46 so that key 55 mates with keyway 57 therein. Low set pointer shaft 61 passes through cover 16 and is rotatably secured therein by means of circular leaf spring 62 and retainer ring 63. Low set pointer 23 is force fitted on the inner end of shaft 61 with its key 64 mating with keyway 65 therein. Low set pointer knob 22 is secured to shaft 61 by means of setscrew 66 which bears against flat surface 67 on the shaft.

With specific reference now to FIG. 2, it can be seen that zero adjustment shaft 26 extends entirely through axial bore 71 in high set pointer shaft 46. High set pointer shaft 46 in turn passes through bore 72 in low set pointer shaft 61. High set pointer bracket 47 is secured to cover 16 by means of screw 73 attached to threaded mounting pedestal 74 which is formed with cover 16. Thus shafts 26, 46 and 61 are rotatable with respect to each other and with respect to cover 16 and bracket 47 which are fixed with respect to meter base 15. These shafts are preferably made of a metal such as brass and are constructed so as to have a minimum of frictional contact with each other. Also shown in FIG. 2 is indicating face or dial 27 which is secured to mounting bracket 75 by means of bolt 76.

The photoelectric means by which the movement of the indicating pointer through specific locations is detected is best illustrated in FIGS. 3 and 4. Attached to low set pointer 23 is bracket 81 on which are mounted lamp 82 and photocell 83. Bracket 81 is mounted at a predetermined angle with respect to set pointer 23, the significance of which will be discussed later. The path of vane 33 passes between lamp 32 and photocell 83 to thereby affect the intensity of the light to which the photocell is exposed. Lamp 84 and photocell 85 are similarly mounted on bracket 86 attached to high set pointer 25 at a similar but opposite angle. The photocells and lamps are appropriately connected to the meter relay electrical circuit (not shown) by means of the wires indicated. The particular mounting brackets shown for the sensing apparatus are examples only and may be significantly different in detail for specific applications.

It is evident from the foregoing description that each set pointer, its associated photoelectric means and its rotational control means are effectively a unitary element. This is important in preventing backlash and positional errors from occurring when the set points are established for each use of the meter relay.

The operative relationships between the set pointers, the indicating pointer, the vane and the photoelectric apparatus are best described with reference to FIG. 3, which is a view from inside the meter looking forward. The dominant member shown in FIG. 3 is high set pointer bracket 47. Pedestals 74 (one of which is shown in FIG. 2), to which bracket 47 is secured, act as stops to limit the angular travel of the set pointers by blocking the further movement of photocell brackets 81, 86 as the respective set pointers reach their upper and lower indicating limits. Low set pointer 23 is shown at its lowest, or zero, setting while the indicating pointer 21 is shown at a position slightly above zero on the meter scale. High set pointer 25 is shown at an intermediate position on the meter scale. The angle between each set pointer and its connected photoelectric apparatus is predetermined in relation to the angular width of vane 33 so that each lamp and cell combination is operated upon by only one edge of the vane. This particular construction eliminates the possibility of ambiguity as to whether the indicating pointer is moving upward or downward on the scale when it passes through a set point.

As shown in FIG. 3, end 91 of vane 33 passes between lamp 82 and photocell 83. The angular width of vane 33 is slightly greater than the angular distance through which low set pointer 23 can travel. For this reason bracket 81 cannot be swung past opposite end 92 of the vane. Therefore, photocell 83 may be illuminated by lamp 82 only when indicating pointer 21 swings upscale sufficiently so that photocell 83 is no longer obscured by end 91 of the vane. Assuming, for example, that the instrument shown in the drawing has an otherwise conventional 90° meter movement, the allowed angle of swing of each of the pointers is approximately 90°. With such a meter, an angle of approximately 130° between set pointer 32 and bracket 81 and an angular width of approximately 100° for vane 33 will provide the relationships desired. If high set pointer 25 and its connected bracket 86 are set up similarly to the low set pointer but with the bracket angle in the opposite direction, it is immediately evident that photocell 85 is exposed to illumination from lamp 84 only when indicating pointer 21 moves downscale so that end 92 of vane 33 does not obscure photocell 85. It, therefore, follows that low set pointer 23 may never be swung far enough upscale so that photocell 83 passes beyond end 92 of vane 33 and high set pointer 25 may not be swung sufficiently far downscale so that photocell 85 passes end 91 of the vane. In the example herein described, the set pointers are adjustable within 0° of each other but high set pointer 25 is prevented from passing downscale with respect to the low set pointer by means of stop 93 formed with and projecting rearwardly from low set pointer 23 as shown in FIGS. 2 and 3. However, in cases where it is desired to allow relative crossover between the set pointers, stop 93 may be eliminated.

The angular rotation of zero adjustment crank 42, which pivots with zero adjustment shaft 26, is limited by stops 94 and 95 which are formed with bracket 47. The wings of the zero adjustment crank are configured to abut these stops within the normal adjustment range of the zero adjustment mechanism of the meter. If it is desired to allow full rotational movement of adjustment crank 42, stops 94 and 95 would not be included.

FIGS. 5A, 5B and 5C are diagrammatic views from the front of the instrument showing the relationships between the set pointers and their connected photoelectric means, and the indicating pointer and its connected vane. In each of these FIGS. low set pointer 23 is resting against stop 96 and high set pointer 25 is resting against stop 97. These stops are shown for purposes of description and only functionally represent the actual mechanical stops located in the meter. The indicating pointer 21 is at approximately the zero position of the scale in FIG. 5A but is shown slightly upscale for reasons of descriptive clarity. Photocell 83 connected to low set pointer 23 is partially obscured by vane 33 while photocell 85 connected to high set pointer 25 is exposed to illumination from its adjacent lamp. FIG. 5B shows indicating pointer 21 at midscale with both of the photocells exposed to full illumination. FIG. 5C shows the same arrangement of the set pointers with the indicating pointer at the top of the scale whereby vane 33 obscures photocell 85 while leaving photocell 83 fully illuminated. As stated previously, the angular rotation of low set pointer 23 upscale all the way to stop 97 is insufficient to swing photocell 83 past the opposite end 92 of vane 33 and the downscale swing of high set pointer 25 is similarly limited.

The electrical relay circuitry is conventional, and, since it forms no part of this invention, is not shown in the drawing. The circuitry typically includes one or more relays and the photocells 83 and 85. Conventional relays are, of course, not necessary. When indicating pointer 21 is between both set pointers, both photocells are illuminated and the relays are in their normal condition. When the indicating pointer proceeds upscale to the high set point, end 92 of vane 33 obscures photocell 85, causing its internal resistance to change. The consequent changes in the relay circuit causes the high relay to change its condition and sound an alarm or produce a signal for corrective changes by appropriate controls or both. As the indicating pointer proceeds upscale, the relay remains in its alarm condition because photocell 85 remains obscured. When the indicating pointer returns below the high set point, photocell 85 is again illuminated and the high relay returns to normal. Similar action occurs when the indicating pointer reaches the low set point.

Positioning the control members of this novel meter relay is relatively simple. All adjustments in the pointer positions, including zero adjustment of the indicating pointer, are made from one location in the front of the meter. If, for example, it is desired to maintain the value of some monitored variable between two specific limits, knob 24 is rotated to position the high set pointer at the upper limit and knob 22 is rotated to position the low set pointer at the lower of these limits. To facilitate the efficient use of two or more set pointers, the knobs and set pointers may be color coded. With the proper connections to indicating and control circuits, the control meter relay will maintain the value of the variable between the two set limits.

It is evident from the foregoing description that a meter relay constructed in accordance with the principles disclosed herein will be simple and economical while enjoying a high degree of operational flexibility. The particular construction of the set pointers and their attached photoelectric detecting means and positional control means is such that location errors cannot occur and backlash in setting the set pointers is eliminated. The appearance of the concentric control configuration is aesthetically pleasing in that all of the meter controls are included within a single coaxial projection from the front of the meter face. This concentric configuration also facilitates the construction, mounting and adjustment of this meter relay. The principles are disclosed herein may be readily adapted to meters in different sizes and styles. Furthermore, the principles of this invention are not limited to one or two set pointers but may be adapted to more than two set pointers if necessary for specific applications. Although the configuration shown in the drawing includes the meter cover as part of the complete control knob assembly wherein the low set pointer shaft 61 is rotatably secured to the cover, it is possible for both set pointers to be mounted on one plate, which plate would then be attached either to the meter cover or to the meter movement itself, as desired.

It should be understood that the novel control and adjustment means disclosed herein apply equally well to a nonindicating control meter relay. Such an instrument has no dial and no elongated indicating or set pointers as such. However, it has a meter movement with zero adjustment means, and it has means for defining set points which are, in effect, set pointers, which detect the angular position of the meter movement in a somewhat conventional manner. The concentric controls described above with respect to the indicating instrument shown in the drawing are also a part of a nonindicating control meter relay.

Having described a preferred embodiment and various alternatives thereof, other modifications and changes will likely occur to those skilled in this art. Accordingly, it is intended that the spirit and scope of this invention be delimited only by the appended claims.

I claim:

1. A noncontacting face-reading control meter relay comprising:
    a case;
    a meter movement mounted within said case, said meter movement including a fixed frame and an element rotatable within said frame about a predetermined axis in relation to electrical signal inputs being measured, a flat visual scale fixed to said frame and having a predetermined angular indicating range, the plane of said scale being substantially perpendicular to said axis, an indicating pointer secured to said meter movement rotatable element and rotatable therewith about said axis in a plane closely adjacent and substantially parallel to said visual scale, said indicating pointer extending radially from said axis and cooperating with said scale to provide visual indications of the scale position of said meter movement rotatable element;
    a plurality of set pointers mounted to said meter relay and extending radially from said axis, said plurality of set pointers being rotatable about said axis within respective planes adjacent and substantially parallel to said visual scale and spaced from the plane of rotation defined by said indicating pointer, said set pointers being angularly moveable over said scale and cooperative therewith to provide visual indication of the scale setting of said set pointers;
    a like plurality of position-detecting means mounted to respective ones of said set pointers for pivotable movement in unison therewith angularly about said axis, said position-detecting means each comprising a lamp and a photosensitive element;
    light-interrupting means comprising an opaque vane mounted to said meter movement rotatable element in fixed angular relationship to said indicating pointer for rotation in unison therewith about said axis for interrupting energy passing between said lamp and said photosensitive element mounted to each of said set pointers, each of said position-detecing means operating normally to provide one output when said indicating pointer is angularly spaced in one direction from the position of respective set pointers and operating to provide a different output when said indicating pointer is angularly spaced in the other direction from the position of respective set pointers, the change between said one output and said different output occurring when the position of said indicating pointer substantially corresponds to the angular position of the respective set pointer; and
    a like plurality of shafts connnected directly to each of said set pointers for positive unitary rotation thereof about said axis, said plurality of shafts being coaxial with said axis, and extending forwardly from said meter movement, said plurality of shafts being mutually concentric and manually rotatable from a position on said axis forward of said meter relay.

2. The meter relay recited in claim 1 and further comprising:
    zero adjustment means coupled to said meter movement rotatable element for permitting limited angular adjustment of the rest position of said indicating pointer with respect to said scale; and
    a rod on said axis directly connected to said zero adjustment means;
    wherein said rod extends forwardly from said meter movement concentric with said plurality of shafts and is manually rotatable from a position on said axis forward of said meter relay.

3. The meter relay recited in claim 1 wherein said plurality of set pointer means is two, said meter relay further comprising stop means secured to one of said set pointers so as to prevent the other of said set pointers from moving therepast.

4. A noncontacting face-reading control meter relay comprising:
   a case;
   a meter movement mounted within said case, said meter movement including a fixed frame and an element rotatable within said frame about a predetermined axis in relation to electrical signal inputs being measured, a flat visual scale fixed to said frame and having a predetermined angular indicating range, the plane of said scale being substantially perpendicular to said axis, an indicating pointer secured to said meter movement rotatable element and rotatable therewith about said axis in a plane closely adjacent and substantially parallel to said visual scale, said indicating pointer extending radially from said axis and cooperating with said scale to provide visual indications of the scale position of said meter movement rotatable element, and zero adjustment means coupled to said meter movement rotatable element for permitting limited angular adjustment of the rest position of said indicating pointer with respect to said scale;
   set pointer means mounted to said meter relay and extending radially from said axis, said set pointer means being rotatable about said axis within a plane adjacent and substantially parallel to said flat visual scale and spaced form the plane of rotation defined by said indicating pointer, said set pointer means being angularly movable over said scale and cooperative therewith to provide visual indication of the scale setting of said set pointer means;
   position-detecting means mounted upon said set pointer means for pivotable movement in unison therewith angularly about said axis, said position-detecting means comprising a lamp and a photosensitive element;
   light-interrupting means comprising an opaque vane mounted to said meter movement rotatable element in fixed angular relationship to said indicating pointer for rotation in unison therewith about said axis for interrupting light passing between said energy source and said energy detector mounted to said set pointer means, said position-detecting means operating normally to provide an output when said indicating pointer is angularly spaced in a first direction from the position of said set pointer means and operating tp provide a different output when said indicating pointer is angularly spaced in a second direction from the position of said set pointer means, the change between said one output and said different output occurring when the position of said indicating pointer substantially corresponds to the angular position of said set pointer means;
   manually rotatable shaft means rigidly connected to said set pointer means for positive unitary rotation thereof about said axis, said shaft means being coaxial with said axis and extending forwardly from said meter movement, the forward end of said shaft means being disposed forward of said case in direct coaxial alignment with said axis; and
   a rod on said axis directly coupled to said zero adjustment means, said rod extending forwardly from said meter movement concentric with said shaft means, said rod being manually rotatable from a position on said axis forward of said meter relay.